United States Patent
Hosono et al.

(10) Patent No.: US 8,111,418 B2
(45) Date of Patent: Feb. 7, 2012

(54) IMAGE PROCESSING SYSTEM, OPERATION METHOD THEREOF, IMAGE PROCESSING APPARATUS AND IMAGE PROCESSING PROGRAM THEREOF

(75) Inventors: Masao Hosono, Toyonaka (JP); Kazumi Sawayanagi, Itami (JP); Hideyuki Matsuda, Suita (JP); Toshihiko Otake, Ikeda (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 169 days.

(21) Appl. No.: 12/707,051

(22) Filed: Feb. 17, 2010

(65) Prior Publication Data

US 2010/0214604 A1  Aug. 26, 2010

(30) Foreign Application Priority Data

Feb. 20, 2009  (JP) .................................. 2009-038679

(51) Int. Cl.
  *G06F 3/12* (2006.01)
  *G06K 15/00* (2006.01)
(52) U.S. Cl. ...................... 358/1.15; 358/1.13; 358/1.16; 358/1.18
(58) Field of Classification Search ......................... None
  See application file for complete search history.

(56) References Cited

U.S. PATENT DOCUMENTS

| | | | | |
|---|---|---|---|---|
| 7,038,801 B2* | 5/2006 | Kurozasa et al. | ............. | 358/1.15 |
| 2007/0047995 A1* | 3/2007 | Haga | ................................ | 399/81 |
| 2008/0046467 A1* | 2/2008 | Nakajima | .................. | 707/104.1 |
| 2009/0036056 A1* | 2/2009 | Oshima et al. | ............... | 455/41.3 |
| 2009/0103124 A1 | 4/2009 | Kimura et al. | | |
| 2009/0141303 A1* | 6/2009 | Azuchi | ......................... | 358/1.15 |
| 2010/0069008 A1* | 3/2010 | Oshima et al. | ............... | 455/41.3 |

FOREIGN PATENT DOCUMENTS

| | | |
|---|---|---|
| JP | 3538407 | 6/2004 |
| JP | 2004-236031 A | 8/2004 |
| JP | 2004-364002 A | 12/2004 |
| JP | 2005-045308 | 2/2005 |
| JP | 3977392 | 9/2007 |

(Continued)

OTHER PUBLICATIONS

Office Action (Notification of Reasons for Refusal) dated Nov. 16, 2010, issued in the corresponding Japanese Patent Application No. 2009-038679, and an English Translation thereof.

(Continued)

*Primary Examiner* — Mark K Zimmerman
*Assistant Examiner* — Satwant Singh
(74) *Attorney, Agent, or Firm* — Buchanan Ingersoll & Rooney PC

(57) ABSTRACT

An image processing system in which a portable terminal and an image processing apparatus are capable of communicating with each other contactlessly, includes: the portable terminal apparatus including: a display; and a transmitter that transmits display information indicating what is currently displayed on the display, to the image processing apparatus over contactless communication, and the image processing apparatus including: a receiver that receives the display information from the portable terminal over contactless communication; a memory that records in advance, display information samples and specified operations for the image processing apparatus, with their connections; and a controller that determines an appropriate operation based on the display information received by the receiver, the display information samples recorded in the memory and the specified operations also recorded in the memory, and makes the image processing apparatus perform that determined operation.

39 Claims, 10 Drawing Sheets

FOREIGN PATENT DOCUMENTS

| | | |
|---|---|---|
| JP | 2008-005286 | 1/2008 |
| JP | 2008-092077 | 4/2008 |
| JP | 2009-037566 | 2/2009 |
| JP | 2009-147896 | 7/2009 |
| JP | 2010-098717 | 4/2010 |
| WO | WO 2007/026938 | 3/2007 |

OTHER PUBLICATIONS

Office Action (Notification of Reasons for Refusal) dated Feb. 8, 2011, issued in the corresponding Japanese Patent Application No. 2009-038679, and an English Translation thereof.

* cited by examiner

| User No | Operation Time | File Format | Operation |
|---------|----------------|-------------|-----------------|
| 00001   | 10:00          | PDF         | FAX Transmission |
| 00002   | 15:00          | PDF         | Printing        |
| 00003   | 18:00          | DOC         | Transfer to Box |

FIG.4

| No | Display Information Sample | Set of Conditions | Operation |
|---|---|---|---|
| 1 | A document is currently displayed on the display | Operation Type: Transfer to Box<br>Operation Time: Same Time | Transfer the file |
| 2 | | Operation Type: Print<br>Operation Time: Same Time<br>Displayed Page: Top Page | Print the file from the top page to the last page |
| 3 | | Operation Type: Print<br>Operation Time: Same Time<br>Displayed Page: Other Than Top Page | Print the file from the displayed page to the last page |
| 4 | | Operation Type: FAX Transmission<br>Operation Time: Same Time | FAX-transmit the file |
| 5 | | Another Set of Conditions | Display a function selection screen |
| 6 | An e-mail setting screen is currently displayed on the display | E-mail Address: Specified | Display a scan and e-mail setting screen |
| 7 | | E-mail Address: Specified<br>File Format: Specified<br>Resolution: Specified | Scan and transmit an e-mail |
| 8 | | Another Set of Conditions with:<br>E-mail Address: Specified<br>E-mail Message includes: Symbol "*" | Scan and transmit an e-mail |
| 9 | | Another Set of Conditions with:<br>E-mail Address: Specified<br>E-mail Message includes: Information other than symbol "*" | Scan and transfer the file |
| 10 | | Another Set of Conditions | Display an e-mail setting screen |
| 11 | A bookmark is currently displayed on the display | | Display a Web page |
| 12 | A folder is currently displayed on the display | There exists a user Box | Folder Synchronization |
| 13 | | Another Set of Condition | Display a print setting screen |
| 14 | A web page is currently displayed in a browser on the display | Map data is displayed in the browser | Download and display map data of the same point from a website for PC |
| 15 | | Another Set of Conditions | Display a Web page |

FIG.5

IMAGE PROCESSING SYSTEM, OPERATION METHOD THEREOF, IMAGE PROCESSING APPARATUS AND IMAGE PROCESSING PROGRAM THEREOF

This application claims priority under 35 U.S.C. §119 to Japanese Patent Application No. 2009-038679 filed on Feb. 20, 2009, the entire disclosure of which is incorporated herein by reference in its entirety.

BACKGROUND OF THE INVENTION

1. Field of the Invention

The present invention relates to an image processing system in which a portable terminal such as a cell-phone and an image processing apparatus such as an image forming apparatus, capable of communicating with each other contactlessly; an operation method of the image processing system; an image processing apparatus; and an image processing program of the image processing apparatus, recorded in a computer readable recording medium to make a computer execute processing.

2. Description of the Related Art

The following description sets forth the inventor's knowledge of related art and problems therein and should not be construed as an admission of knowledge in the prior art.

Some of the recent MFPs (Multi Function Peripherals), for example multifunctional digital image forming apparatuses having the copy function, the print function, the scan function, the FAX function and other functions, have a contactless communicator. And some of the recent cell-phones also have a contactless communicator. Furthermore, there is a technology to improve the operability of such a MFP with usage of such a cell-phone (for example, Japanese Unexamined Laid-open Patent Publications No. 2004-236031 and No. 2004-364002).

However, in the conventional technologies including the above-mentioned patent documents, which serve to operate a MFP via a contactless communicator by using a portable terminal, a setting or other information of the portable terminal is simply transmitted to the MFP. And a user has to manually operate the MFP to make it perform his/her intended operation based on a setting or information received from the portable terminal, which is troublesome.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image processing system capable of making an image processing apparatus perform a user's intended operation based on information contactlessly transmitted to the image processing apparatus from a portable terminal.

It is another object of the present invention to provide an image processing apparatus that can be preferably employed in the image processing system.

It is yet another object of the present invention to provide an operation method capable of making an image processing apparatus perform a user's intended operation based on information contactlessly transmitted to the image processing apparatus from a portable terminal.

It is still yet another object of the present invention to provide an image processing program recorded in a computer readable recording medium to make a computer of the image processing apparatus execute processing.

According to a first aspect of the present invention, an image processing system in which a portable terminal and an image processing apparatus are capable of communicating with each other contactlessly, includes:

the portable terminal apparatus including:
 a display; and
 a transmitter that transmits display information indicating what is currently displayed on the display, to the image processing apparatus over contactless communication, and the image processing apparatus including:
 a receiver that receives the display information from the portable terminal over contactless communication;
 a memory that records in advance, display information samples and specified operations for the image processing apparatus, with their connections; and
 a controller that determines an appropriate operation based on the display information samples recorded in the memory, the specified operations also recorded in the memory and the display information received by the receiver, and makes the image processing apparatus perform that determined operation.

According to a second aspect of the present invention, an image processing apparatus capable of communicating with a portable terminal contactlessly, includes:

a receiver that receives from the portable terminal, display information indicating what is currently displayed on a display of the portable terminal, over contactless communication;
a memory that records in advance, display information samples and specified operations for the image processing apparatus, with their connections; and
a controller that determines an appropriate operation based on the display information samples recorded in the memory and the specified operations also recorded in the memory and the display information received by the receiver, and makes the image processing apparatus perform that determined operation.

According to a third aspect of the present invention, an operation method of an image processing system in which a portable terminal and an image processing apparatus are capable of communicating with each other contactlessly, includes:

the portable terminal apparatus's:
transmitting display information indicating what is currently displayed on a display of the portable terminal, to the image processing apparatus over contactless communication, and the image processing apparatus's:
receiving the display information from the portable terminal over contactless communication; and
determining an appropriate operation based on the display information received therefrom, and display information samples and specified operations for the image processing apparatus, recorded in advance in a memory of the image processing apparatus with their connections, and making the image processing apparatus perform that determined operation.

According to a forth aspect of the present invention, an image processing program of an image processing apparatus capable of communicating with a portable terminal contactlessly, is recorded in a computer readable recording medium to make a computer of the image processing apparatus execute:

receiving display information indicating what is currently displayed on a display of the portable terminal, from the portable terminal apparatus over contactless communication;

determining an appropriate operation based on the display information received therefrom, and display information samples and specified operations for the image processing apparatus, recorded in advance in a memory of the image processing apparatus with their connections, and making the image processing apparatus perform that determined operation.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 4 is a view showing an example of operation logs of the image processing apparatus;

FIG. 5 shows a table to select an appropriate process based on display information received from the portable terminal;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
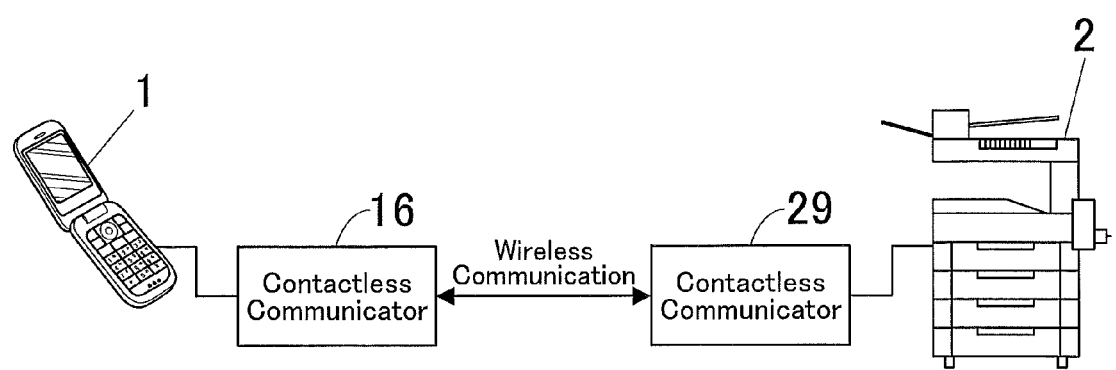
FIG. 1 is a view showing a configuration of an image processing system according to one embodiment of the present invention.

FIG. 1 is a view showing a configuration of an image processing system according to one embodiment of the present invention. This image processing system includes a portable terminal 1 constructed of a cell-phone, a PDA (Personal Digital Assistant) or etc., and a MFP 2 that is an image forming apparatus employed as an image processing apparatus. And the portable terminal 1 and the MFP 2 are capable of exchange data to each other contactlessly (wirelessly), via contactless communicators 16 and 29 provided thereto, respectively.

Figure 2:
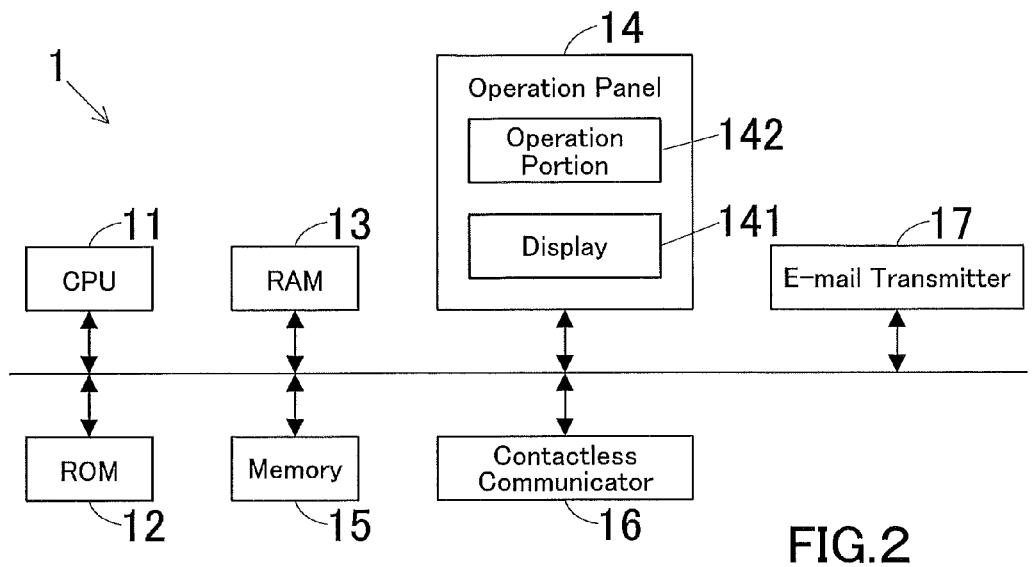
FIG. 2 is a block diagram schematically showing a configuration of a portable terminal employed in the image processing system of FIG. 1.

FIG. 2 is a block diagram schematically showing a configuration of the portable terminal 1.

As shown in FIG. 2, the portable terminal 1 includes a CPU 11, a ROM 12, a RAM 13, an operation panel 14, a memory 15, a contactless communicator 16, an e-mail exchanger 17 and etc.

The CPU 11 centrally controls all operations of the portable terminal 1. Furthermore, in this embodiment, the CPU 11 transmits to the MFP 2 via the contactless communicator 16, display information indicating what is currently displayed on the display 14, login information that is user information of a user trying to log in the MFP 2 or a password, and other information. The display information will be detailed later with some specific examples.

The ROM 12 is a memory that stores in itself, an operation program for the CPU 11 and other data. The RAM 13 is a memory that provides a work area for the CPU 11 to execute processing according to an operation program.

The operation panel 14 includes a display 141 and an operation portion 142. The display 141 displays on itself display screens, messages and other information according to an application program (also will be simply referred to as "application") activated thereon. The operation portion 142 has operation selecting keys and other keys, serving for various entry operations.

The memory 15 records in itself, various applications, document data, setting information such as e-mail addresses, and other various kinds of data.

The contactless communicator 16 exchanges data and information with the MFP 2 by activating an application to communicate with the MFP 2 contactlessly. The contactless communication method employed here is not limited to a specific method, and may be a well-known method.

The e-mail exchanger 17 serves to transmit and receive e-mails by activating the e-mail function.

Figure 3:
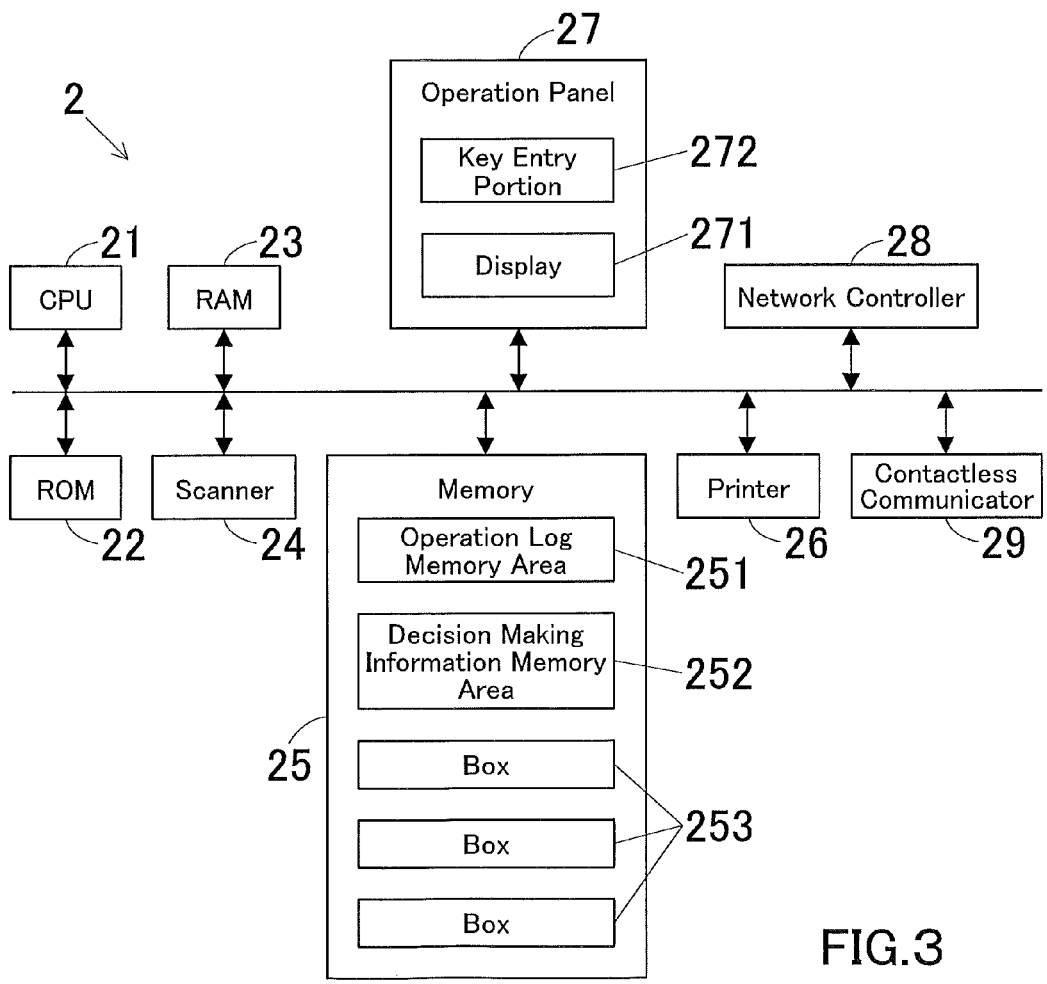
FIG. 3 is a block diagram schematically showing a configuration of an image processing apparatus employed in the image processing system of FIG. 1.

FIG. 3 is a block diagram schematically showing a configuration of the MFP 2.

The MFP 2 includes a CPU 21, a ROM 22, a RAM 23, a scanner 24, a memory 25, a printer 26, an operation panel 27, a network controller (NIC) 28, a contactless communicator 29 and etc.

The CPU 21 makes the MFP 2 perform the basic operations thereof: copy, print, facsimile transmission and scan transmission operations for example, by centrally controlling the MFP 2. Furthermore, in this embodiment, receiving display information and etc. from the portable terminal 1 via the contactless communicator 29, the CPU 21 selects an appropriate operation to be performed by the MFP 2, based on the display information received therefrom and its connected information for decision making, recorded in the memory 25, then makes the MFP 2 perform that operation.

The ROM 22 is a memory that stores in itself, an operation program for the CPU 21 and other data.

The RAM 23 is memory that provides a work area for the CPU 21 to execute processing according to an operation program.

The scanner 24 is a reader that reads an image of a document placed on a document table (not shown in Figure) to output image data.

The memory 25 is constructed of a nonvolatile memory device such as a hard disk drive (HDD). This memory 25 includes an operation log memory area 251, a decision making information memory area 252, a plurality of Boxes 253 that correspond to directories capable of recording data by category, and other areas.

The operation log memory area 251 records in itself, log information about the operations having been performed by the MFP 2, from which it is recognized that a user using the portable terminal 1 was logged in the MFP 2 by transmitting thereto login information such as a user ID and a password, and further transmitted document data to the MFP 2 with an instruction to perform an operation on the document data, and the MFP 2 performs an operation according to the instruction.

More specifically, in the operation log memory area 251, user information of users who gave an instruction to perform operations, operation times, document file formats and operation types are recorded as operation logs, with their connections. For example, according to the FIG. 4, the log No. 1 is recorded as the following: User Number: 00001, Operation Time: 10:00, File Format: PDF and Operation Type: Facsimile (FAX) Transmission.

In the decision making information memory area 252, a decision making table shown in FIG. 5 is recorded.

As shown in FIG. 5, display information samples received from the portable terminal 1 and appropriate operations to be performed by the MFP 2 are recorded in advance in the decision making table, with their connections. By comparing this table and display information actually received from the portable terminal 1, the MFP 2 selects an appropriate operation to perform based on the received display information, then performs that operation.

For example, if the display information indicates that a document is currently displayed on the display and also it is judged that the user using the portable terminal 1, the format of the displayed document and the receipt time of the display information match any of the operation logs recorded in the operation log memory area 251, including user information, operation times and file formats as shown in FIG. 4, the MFP 2 selects a certain operation recorded in the matched operation log, i.e. selects an appropriate operation to perform based on the received display information, then performs that selected operation.

More concretely, if Transfer-to-Box is recorded in the matched operation log, the MFP 2 performs an operation to transfer received document data to a Box recorded in the operation log (No. 1 in FIG. 5). If printing is recorded in the matched operation log, the MFP 2 prints out the document data received from the portable terminal 1. In this embodiment, if the top page of the document is currently displayed on the display of the portable terminal 1, in other words, if the display information indicates that the top page of the document is currently displayed on the display, the document data is entirely printed out, from the top page to the last page (No. 2 in FIG. 5). Meanwhile, if one of the pages that follow the top page of the document is currently displayed on the display, in other words, the display information indicates that one of the pages that follow the top page of the document is currently displayed on the display, the document data is partially printed out, from that displayed page to the last page (No. 3 in FIG. 5).

If FAX transmission is recorded in the matched operation log, the MFP 2 FAX-transmits received document data to an address recorded in the operation log (No. 4 in FIG. 5).

If there is no matched operation log, the MFP 2 displays a function selection screen on the operation 271 of the operation panel 27 (No. 5 in FIG. 5).

Figures 6, 7:
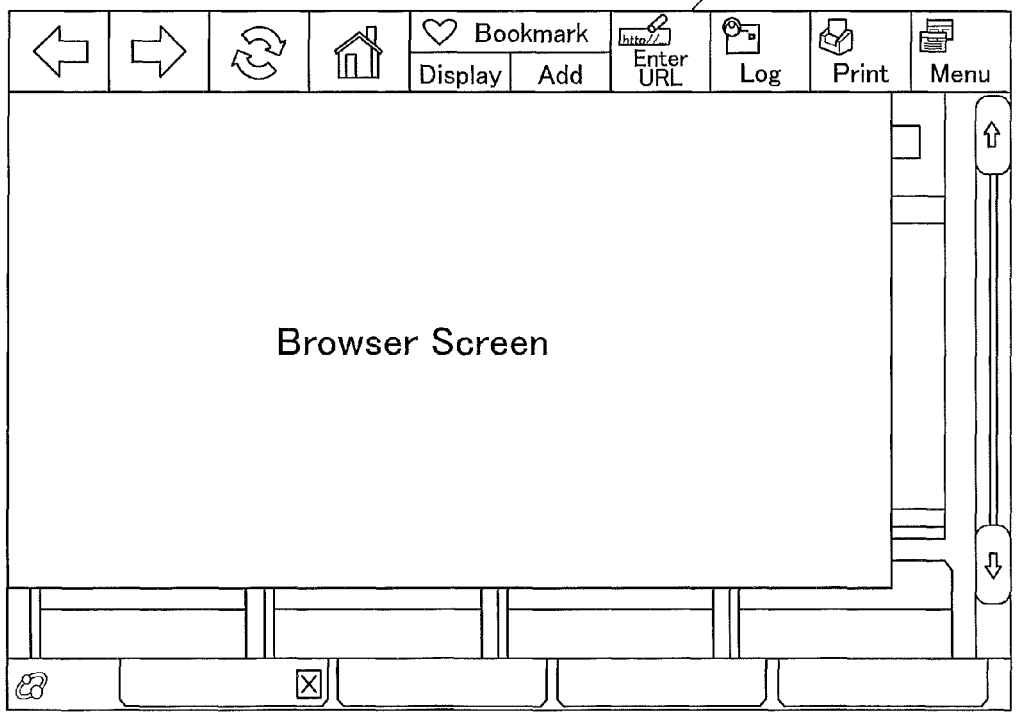
FIG. 6 is a view showing a scan and e-mail setting screen displayed on a display of the image processing apparatus.
FIG. 7 is a view showing a browser screen displayed on a display of the image processing apparatus.

If the display information indicates that an e-mail setting screen, in which e-mail addresses are already specified, is currently displayed on the display, the MFP 2 displays on the display 271 of the operation panel 27, a scan and e-mail setting screen to transmit an e-mail carrying image data read out from a document by the scanner, as shown in FIG. 6, to the specified e-mail addresses (No. 6 in FIG. 5).

Via the scan and e-mail setting screen shown in FIG. 6, a document reading resolution for the scanner and a file format for image data read out from a document, which is an attached file, can be specified. After specifying them, a document is placed on the scanner and a start button not shown in Figure is pressed. Subsequently, the scanner's document reading is started at the specified resolution and image data read out from the document is attached to an e-mail in the specified format. And the e-mail is transmitted to the specified addresses.

If the display information indicates that an e-mail setting screen in which e-mail addresses are already specified, is currently displayed on the display and also the display information includes set values for a reading resolution for the scanner and a file format for an attached file, the MFP 2 reads a document by the scanner according to the set values and transmits an e-mail, without displaying the scan and e-mail setting screen shown in FIG. 6, on the display 271 (No. 7 in FIG. 5).

If the display information indicates that an e-mail setting screen, in which e-mail addresses are already specified, is currently displayed on the display and the display information further indicates that predetermined information (a predetermined symbol such as "*") is already entered in an e-mail message field of the e-mail setting screen, the MFP 2 reads a document by the scanner and transmits an e-mail, without displaying the scan and e-mail setting screen shown in FIG. 6, on the display 271 (No. 8 in FIG. 5). In this case, default values set on the MFP 2 for a document reading resolution for the scanner and a file format for an attached file, are employed.

If the display information indicates that an e-mail setting screen, in which e-mail addresses are already specified, is currently displayed on the display and the display information further indicates information other than the predetermined one is already entered in the e-mail message field of the e-mail setting screen, the MFP 2 reads the document by the scanner and transmits obtained image data (an image file) to the portable terminal 1 (No. 9 in FIG. 5).

If the display information indicates that an e-mail setting screen, in which e-mail addresses are already specified, is currently displayed on the display and the conditions are not like the cases of No. 6, 7, 8 and 9 of FIG. 5, the MFP 2 displays an e-mail transmission screen on the display 271 (No. 10 in FIG. 5).

If the display information indicates that a bookmark specifying an address of a predetermined Web page is currently displayed on the display, the MFP 2 accesses the address and displays the Web page obtained therefrom on the display 271 (No. 11 in FIG. 5).

If the display information indicates that a folder of the portable terminal 1 is currently displayed on the display, the MFP 2 performs folder synchronization to synchronize contents between the folder of the portable terminal 1 and a Box owned by the user using the portable terminal 1 (No. 12 in FIG. 5).

In this case, if a Box owned by the user using the portable terminal 1 does not exist in the MFP 2, the MFP 2 displays a print setting screen on the display 271 (No. 13 in FIG. 5).

If the display information indicates that map data is currently displayed on the display, the MFP 2 downloads detailed map data of the same point for PC from a website and displays the detailed map data on the display 271 (No. 14 in FIG. 5).

If the display information indicates that a Web page other than that containing map data, is currently displayed on the display, the MFP 2 displays that Web page on the display 271 (No. 15 in FIG. 5).

Back to FIG. 3, the printer 26 prints out image data read out from a document by the scanner 24, document data received from the portable terminal 1, print data received from an external device such as a personal computer, and other data.

The operation panel 27 includes the display 271 constructed of a liquid crystal display with touch panel functionality to display an operation state of the MFP 2, messages and other information, and a key entry portion 272 having a numeric key pad, a start key, a stop key and other keys.

The network controller (NIC) 28 serves as a communicator to exchange data with external devices via a network, for example LAN.

The contactless communicator 29 serves to exchange data with the portable terminal 1 contactlessly (wirelessly).

Hereinafter, the method for using the image processing system shown in FIG. 1 will be explained with one example.

The portable terminal 1 has a capability of multitask operation, and as described above, the portable terminal 1 has an application preliminarily installed thereon to communicate with the MFP 2 via a contactless communicator.

In this embodiment, the portable terminal 1 having a setting configured in advance to make the MFP 2 perform certain operations, activates a communication application by multitask operation, and thereby the communication application recognizes an operation state of the portable terminal 1 and what is currently displayed on the display 141 of the operation panel 14.

As soon as establishing a connection with the MFP 2 via the contactless communicator 16, the communication application installed on the portable terminal 1 transmits a user's login information to the MFP 2 to let the user logged in the MFP 2. If the login succeeded, the communication application transmits to the MFP 2, display information indicating what is currently displayed on the display 141 of the operation panel 14, which is recognized by the communication application when activated.

Receiving the display information from the portable terminal 1, the MFP 2 selects an appropriate operation from the table shown in FIG. 5, based on the received display information, then performs that operation.

Example 1

Here is a User A (User No.: 00002) who usually prints document data in the PDF format about at 15:00, and this user opens and displays a PDF document on the display 141 of the portable terminal 1 to print the document, about at 15:00 as usual.

And while the document is displayed on the display, the user enables communication with the MFP 2 by activating an application to communicate with the MFP 2, and transmits to the MFP 2 login information including user information and display information including document data.

Receiving the login information and the display information, the MFP 2 recognizes that the document data is currently displayed on the display. And the MFP 2 searches this user's operation logs like shown in FIG. 4, for an operation performed on the file (document data) in the same format at the same time in the past, then selects an appropriate operation from the table shown in FIG. 5, based on the display information. However, it does not necessarily have to be an operation performed exactly at the same time, and an operation having been performed within an allowable time range that is set in advance may be recognized as being performed at the same time.

And then, the MFP 2 performs that selected operation, for example printing, on the received document data.

Here, if the top page of the document is currently displayed on the portable terminal 1, the document data is entirely transmitted to the MFP 2 and all pages are printed, for example. Meanwhile, if one of the pages that follow the top page of the document is currently displayed on the portable terminal 1, the document data is partially transmitted to the MFP 2 and pages from that displayed one to the last one are printed.

Example 2

When the User A would like to transmit image data read out from a document by the scanner 24 of the MFP 2, to an e-mail address recorded in the portable terminal 1, the user activates an e-mail application (so-called "mailer") to display an e-mail setting screen on the display 141 of the portable terminal 1, and specifies a preferable e-mail address via the screen.

And while the screen is displayed on the display, the user enables communication with the MFP 2 by activating an application to communicate with the MFP 2, and transmits to the MFP 2 display information including the e-mail address.

Receiving the display information, the MFP 2 selects an appropriate operation from the table shown in FIG. 5, based on the display information, and displays a scan and e-mail setting screen on the display 271 of the operation panel 27.

Example 3

When the User A would like to display a Web page in a large screen on the display 271 of the MFP 2, the user activates a browser on the portable terminal 1 to display a bookmark of a target Web page, on the display 141.

And while the bookmark is displayed on the display, the user enables communication with the MFP 2 by activating an application to communicate with the MFP 2, and transmits to the MFP 2 display information including the target Web page's address specified by the bookmark.

Receiving the display information, the MFP 2 selects an appropriate operation from the table shown in FIG. 5, based on the display information. And the MFP 2 activates a browser to access the Web page's address included in the display information, and then displays the Web page obtained thereby, in a browser screen on the display 271, as shown in FIG. 7.

Example 4

When the User A would like to synchronize contents between a folder of the portable terminal 1 and a personal Box of the MFP 2, the user opens a target folder on the portable terminal 1 to display the folder on the display 141.

And while the target folder is displayed on the display, the user enables communication with the MFP 2 by activating an application to communicate with the MFP 2, and transmits to the MFP 2 display information including a list of the files recorded in the folder.

Receiving the display information, the MFP 2 selects an appropriate operation from the table shown in FIG. 5, based on the display information, then performs folder synchronization.

To perform folder synchronization, the portable terminal 1 may transmit all the files recorded in the folder to the portable terminal 1, alternatively the MFP 2 may detect its lacking files from the file list and transmit a request only for the lacking files to the portable terminal 1.

Example 5

When the User A would like to view a map displayed on the display 141 of the portable terminal 1 in more detail, the user enables communication with the MFP 2 by activating an application to communicate with the MFP 2, and transmits to the MFP 2 display information including data of the map, while the map is displayed on the display.

Receiving the display information, the MFP 2 selects an appropriate operation from the table shown in FIG. 5, based on the display information, then downloads detailed map data of the same point for PC from a website and displays it on the display 271.

Example 6

When the User A would like to transmit image data read out from a document by the scanner 24 of the MFP 2, directly to an e-mail address recorded in the portable terminal 1, the user activates an e-mail application on the portable terminal 1 to display an e-mail setting screen on the display 141 of the portable terminal 1, and specifies a preferable e-mail address via the screen. Furthermore, the user stores in a setting file of the portable terminal 1, a reading resolution for the scanner 24, a file format for an attached file and other settings.

And while the screen is displayed on the display, the user enables communication with the MFP 2 by activating an application to communicate with the MFP 2, and transmits to the MFP 2 display information including the e-mail address, the reading resolution, the format for an attached file and other settings.

Receiving the display information, the MFP 2 selects an appropriate operation from the table shown in FIG. 5, based on the display information. Subsequently, the MFP 2 reads a document by the scanner 24 at the specified reading resolution, attaches obtained data to an e-mail in the specified format, and then transmits the e-mail to the specified e-mail address, without displaying a scan and e-mail setting screen on the display.

Example 7

When the user A would like to transmit image data read out from a document by the scanner 24 of the MFP 2, directly to an e-mail address recorded in the portable terminal 1, the user activates an e-mail application on the portable terminal 1 to display an e-mail setting screen on the display 141 of the portable terminal 1, and specifies a preferable e-mail address via the screen. Furthermore, the user enters predetermined information that is only "*" for example, in an e-mail message field thereof.

And while the screen is displayed on the display, the user enables communication with the MFP 2 by activating an application to communicate with the MFP 2, and transmits to the MFP 2 display information including the e-mail address and the predetermined information.

Receiving the display information, the MFP 2 selects an appropriate operation from the table shown in FIG. 5, based on the display information. Subsequently, the MFP 2 reads a document by the scanner 24 at a default reading resolution, attaches obtained data to an e-mail in a default format, and then transmits the e-mail to the specified e-mail address, without displaying a scan and e-mail setting screen on the display.

Example 8

When the User A would like to transfer to the portable terminal 1, image data read out from a document by the scanner 24 of the MFP 2, the user activates an e-mail application on the portable terminal 1 to display an e-mail setting screen on the display 141 of the portable terminal 1, and specifies an e-mail address via the screen. Furthermore, the user enters information other than predetermined information that is "*" for example, in an e-mail message field thereof.

And while the screen is displayed on the display, the user enables communication with the MFP 2 by activating an application to communication with the MFP 2, and transmits to the MFP 2 display information including the specified e-mail address and the entered information.

Receiving the display information, the MFP 2 selects an appropriate operation from the table shown in FIG. 5, based on the display information, reads a document by the scanner 24 at a default reading resolution, and then transfers obtained data to the portable terminal 1.

As described above, when a user using the portable terminal 1 enables communication with the MFP 2 while information related to a target operation is displayed on the display 141 of the portable terminal 1, display information is transmitted to the MFP 2, and an appropriate operation selected based on the display information, i.e. this user's intended operation is automatically performed by the MFP 2. That is, the user does not have to operate the MFP 2 after operating the portable terminal 1 any more to make the MFP 2 perform his/her intended operation. This could improve user conveniences.

Figure 8:
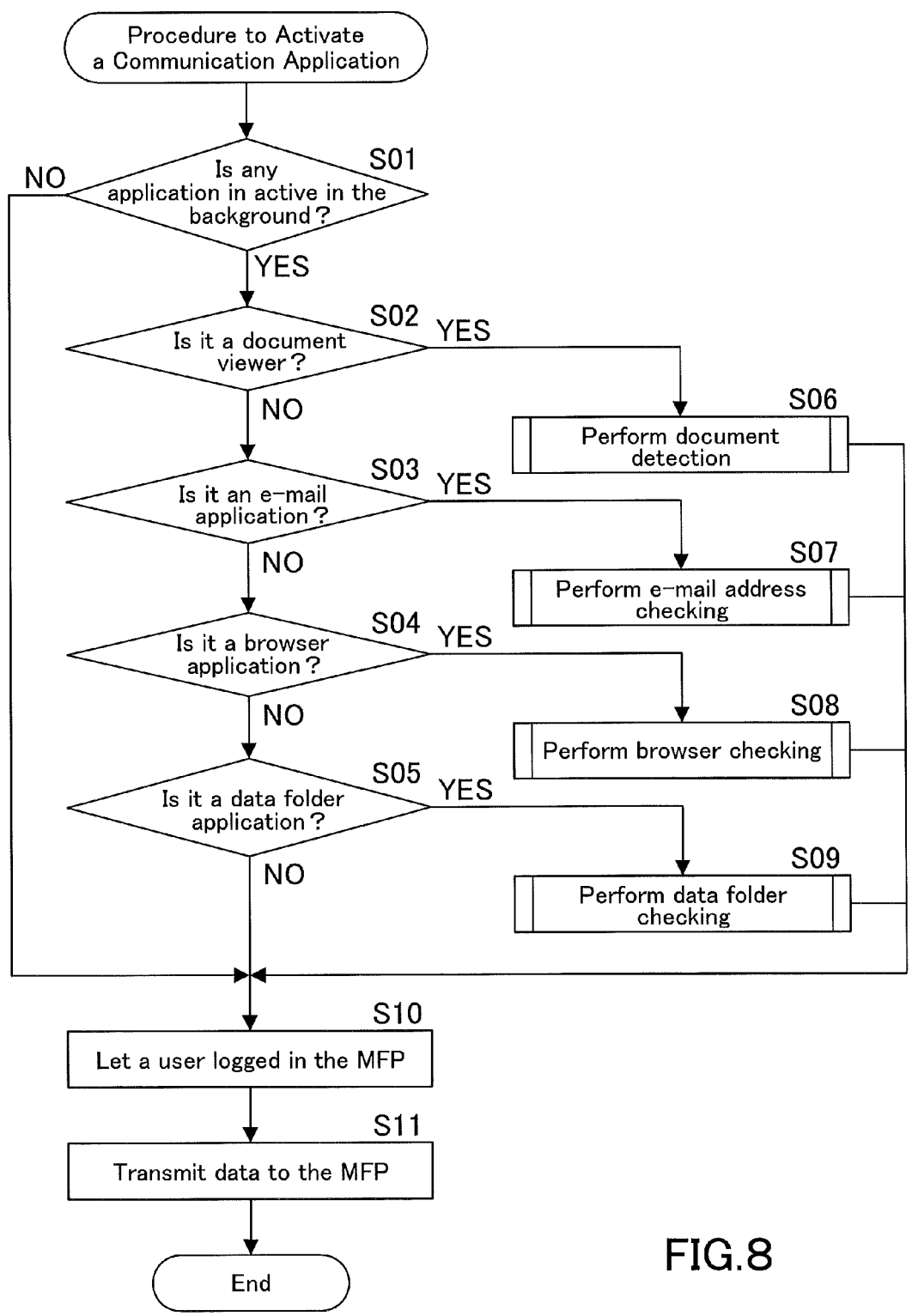
FIG. 8 is a flowchart representing a procedure to activate an application to communicate with the image processing apparatus, executed in the portable terminal.

FIG. 8 is a flowchart to explain a procedure to activate an application to communicate with the MFP 2 (hereinafter will be simply referred to as "application" in Figures), executed in the portable terminal 1. This procedure is executed by the CPU 11 of the portable terminal 1 according to an operation program recorded in a recording medium such as the ROM 12.

In Step S01, it is judged whether or not any application is in active in the background. If there is no application in active (NO in Step S01), the routine proceeds to Step S10. If there is an application in active (YES in Step S01), the routine proceeds to Step S02.

In Step S02, it is judged whether or not a document viewer is in active. If it is in active (YES in Step S02), the routine proceeds to Step S06, wherein document detection is performed. After that, the routine proceeds to Step S10. The document detection will be detailed later.

In Step S02, if a document viewer is not in active (NO in Step S02), then it is judged in Step S03, whether or not an e-mail application is in active. If it is in active (YES in Step S03), the routine proceeds to Step S07, wherein e-mail address checking is performed. After that, the routine proceeds to Step S10. The e-mail address checking will be detailed later.

In Step S03, if an e-mail application is not in active (NO in Step S03), then it is judged in Step S04, whether or not a browser application is in active. If it is in active (YES in Step S04), the routine proceeds to Step S08, wherein browser checking is performed. After that, the routine proceeds to Step S10. The browser checking will be detailed later.

In Step S04, if a browser application is not in active (NO in Step S04), then it is judged in Step S05, whether or not a data folder application is in active. If it is in active (YES in Step S05), the routine proceeds to Step S09, wherein data folder checking is performed. After that, the routine proceeds to Step S10. The data folder checking will be detailed later.

In Step S05, if a data folder application is not in active (NO in Step S5), the routine proceeds to Step S10.

In Step S10, a login process to let a user logged in the MFP2 is performed. And in Step S11, data transmission to transmit data such as display information to the MFP 2, is performed. Then, the procedure to activate a communication application terminates.

Figure 9:
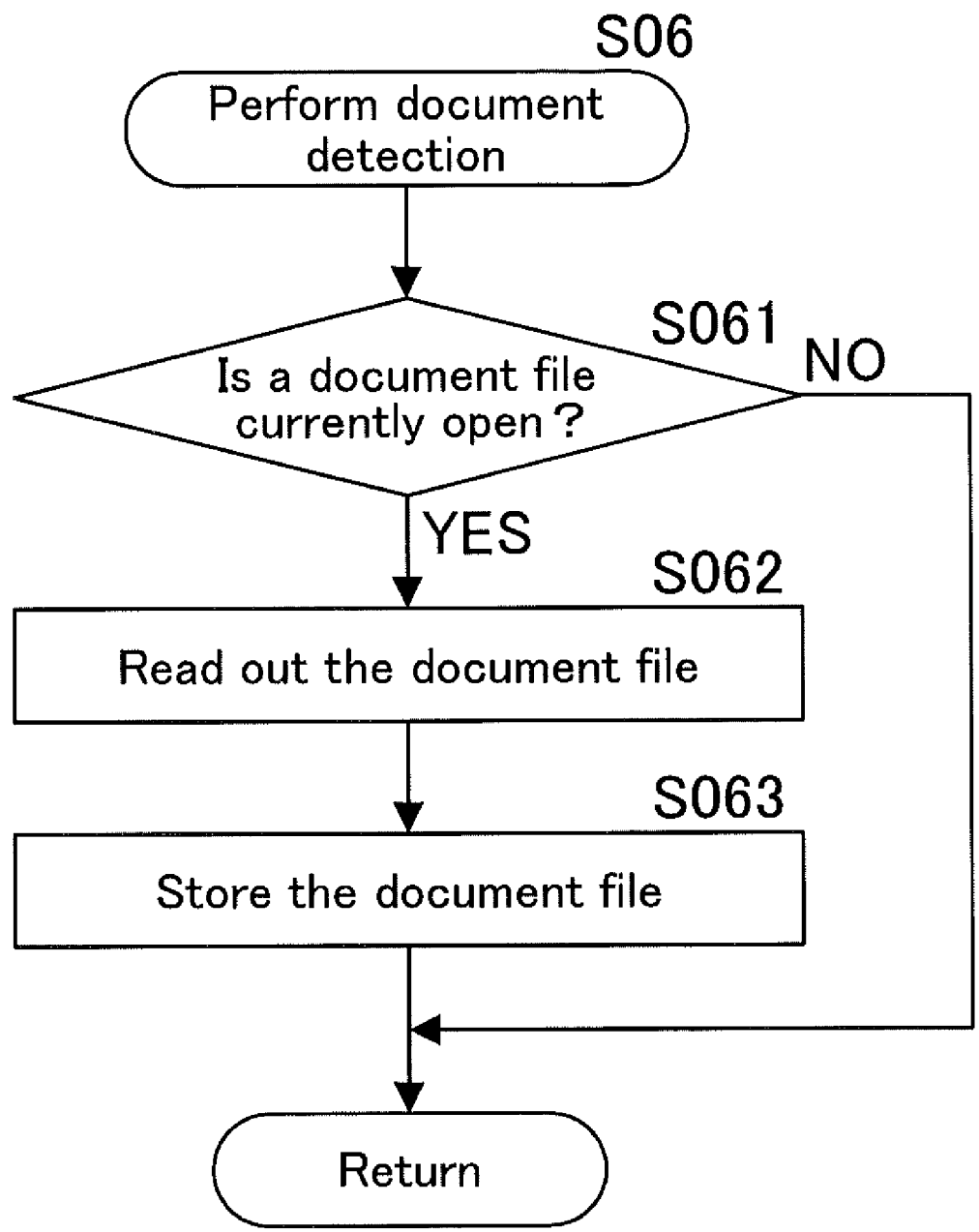
FIG. 9 is a flowchart representing a subroutine that is a document detection process in Step S06 of FIG. 8.

FIG. 9 is a flowchart representing a subroutine that is the document detection in Step S06 of FIG. 8.

In Step S061, it is judged whether or not a document file (document data) is currently open by the viewer. If it is currently open (YES in Step S061), the document file is read out in Step S062, and the obtained document file is stored in Step S063. Then the subroutine returns to the main routine. If a document file is not currently open (NO in Step S061), the subroutine immediately returns to the main routine. The document file stored in this step will be transmitted to the MFP 2 in Step S11 of FIG. 8.

Figure 10:
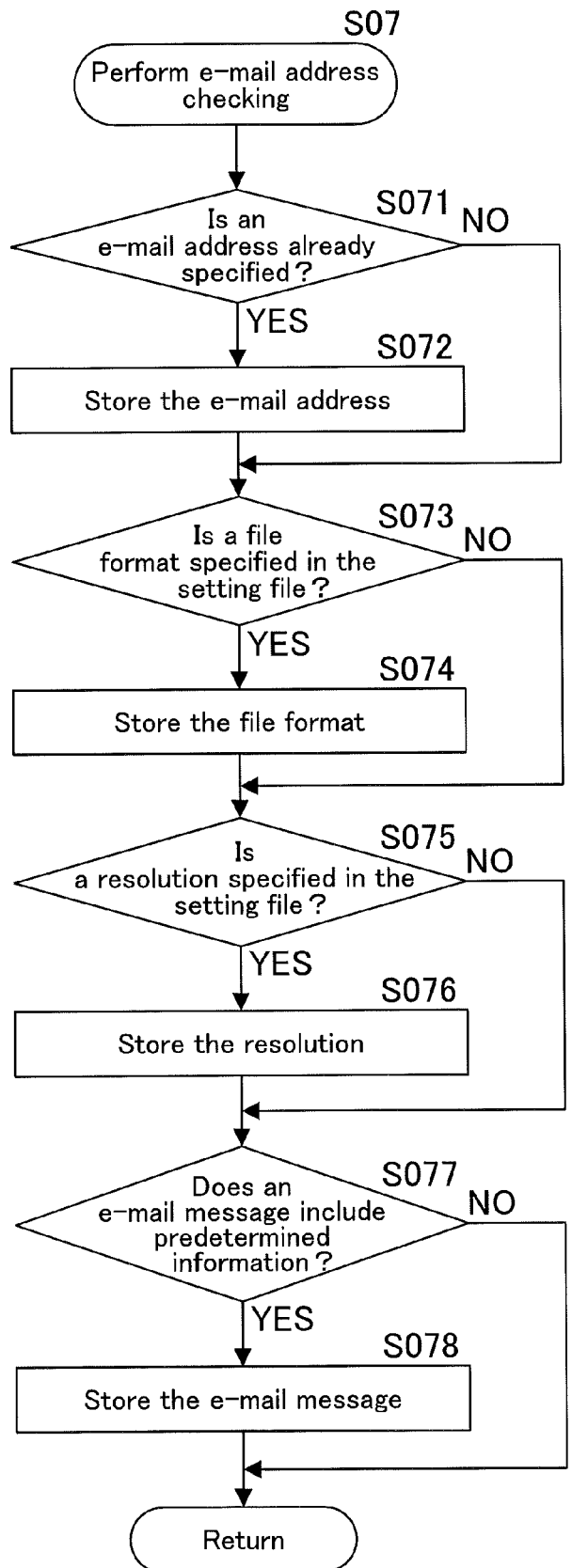
FIG. 10 is a flowchart representing a subroutine that is an e-mail address check process in Step S07 of FIG. 8.

FIG. 10 is a flowchart representing a subroutine that is the e-mail address checking in Step S07 of FIG. 8.

In Step S071, it is judged whether or not an e-mail address is already specified. If it is already specified (YES in Step S071), the e-mail address is stored in Step S072, then the subroutine proceeds to Step S073. If an e-mail address is not specified yet (NO in Step S071), the subroutine directly proceeds to Step S073.

In Step S073, it is judged whether or not a file format for an attached file is specified in the setting file. If it is specified (YES in Step S073), the specified file format is stored in Step S074, then the subroutine proceeds to Step S075. If a file format is not specified (NO in Step S073), the subroutine directly proceeds to Step S075.

In Step S075, it is judged whether or not a reading resolution for the scanner 24 is specified in the setting file. If it is specified (YES in Step S075), the reading resolution is stored in Step S076, then the subroutine proceeds to Step S077. If a reading resolution is not specified (NO in Step S075), the subroutine directly proceeds to Step S077.

In Step S077, it is judged whether or not an e-mail massage includes a predetermined symbol, for example. If it includes (YES in Step S077), the e-mail message is stored in Step S078, then the subroutine returns to the main routine. If it does not include a predetermined symbol (NO in Step S077), the subroutine immediately returns to the main routine. The stored set values for a file format and a reading resolution will be transmitted to the MFP 2, in Step S11 of FIG. 8.

Figure 11:
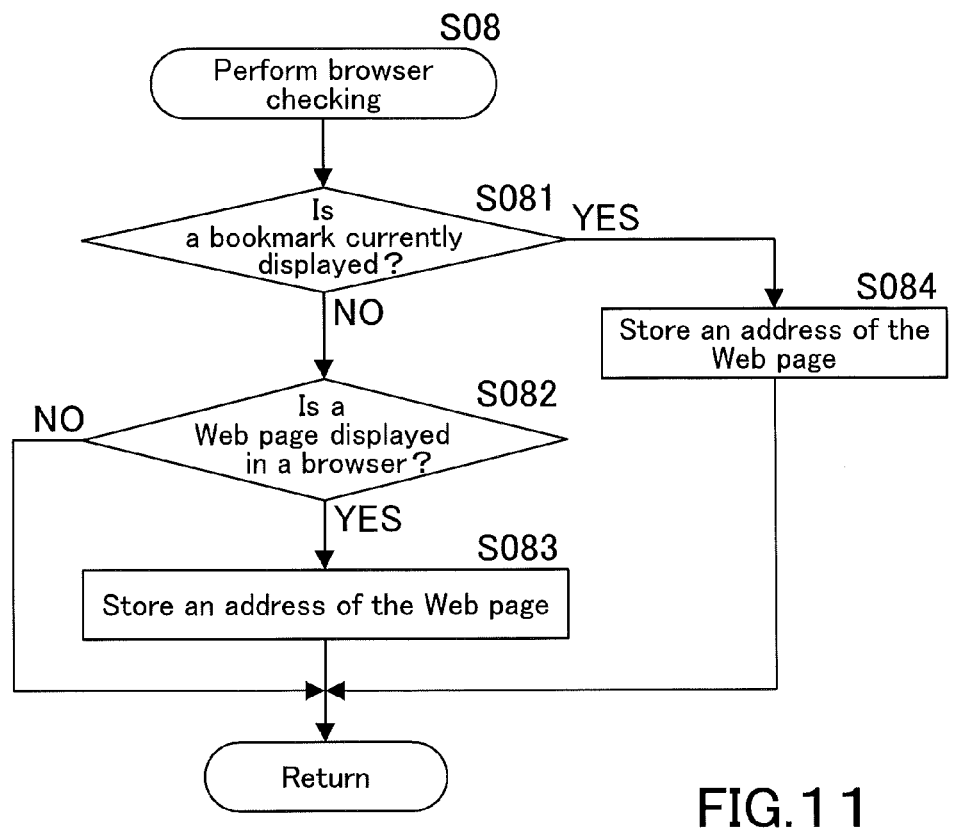
FIG. 11 is a flowchart representing a subroutine that is a browser check process in Step S08 of FIG. 8.

FIG. 11 is a flowchart representing a subroutine that is the browser checking in Step S08 of FIG. 8.

In Step S081, it is judged whether or not a bookmark is currently displayed on the display. If it is currently displayed (YES in Step S081), a Web page's address specified by the bookmark is stored in Step S084, then the subroutine returns to the main routine.

If a bookmark is not currently displayed on the display in Step S081 (NO in Step S081), then it is judged in Step S082, whether or not a Web page is currently displayed in a browser. If it is currently displayed in a browser (YES in Step S082), an address of the displayed Web page is stored in Step S083, then the subroutine returns to the main routine. The address stored in this step will be transmitted to the MFP 2 in Step S11 of FIG. 8.

Figure 12:
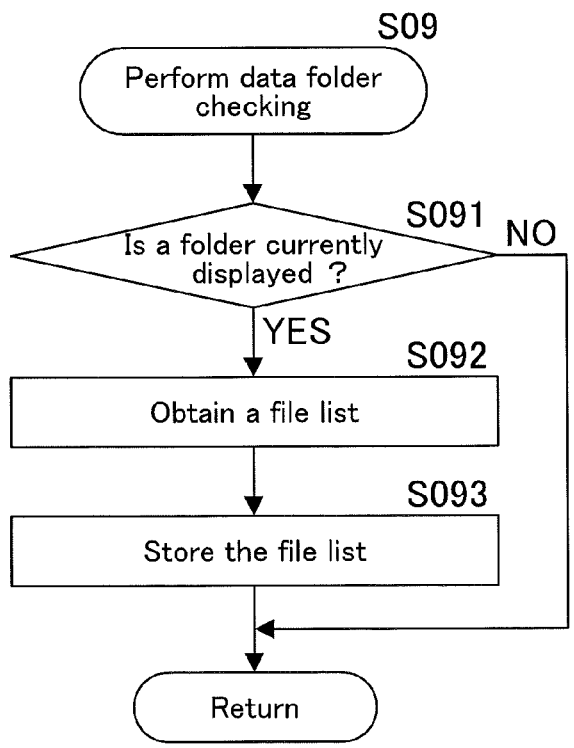
FIG. 12 is a flowchart representing a subroutine that is a data folder check process in Step S09 of FIG. 8.

FIG. 12 is a flowchart representing a subroutine that is the data folder checking in Step S09 of FIG. 8.

In Step S091, it is judged that a folder is currently displayed on the display. If it is not currently displayed (NO in Step S091), the subroutine immediately returns to the main routine. If it is currently displayed (YES in Step S091), a list of the files stored in the folder is obtained in Step S092, and the obtained list is stored in Step S093. Then the subroutine returns to the main routine. The list stored in this step will be transmitted to the MFP 2 in Step S11 of FIG. 8.

Figure 13:
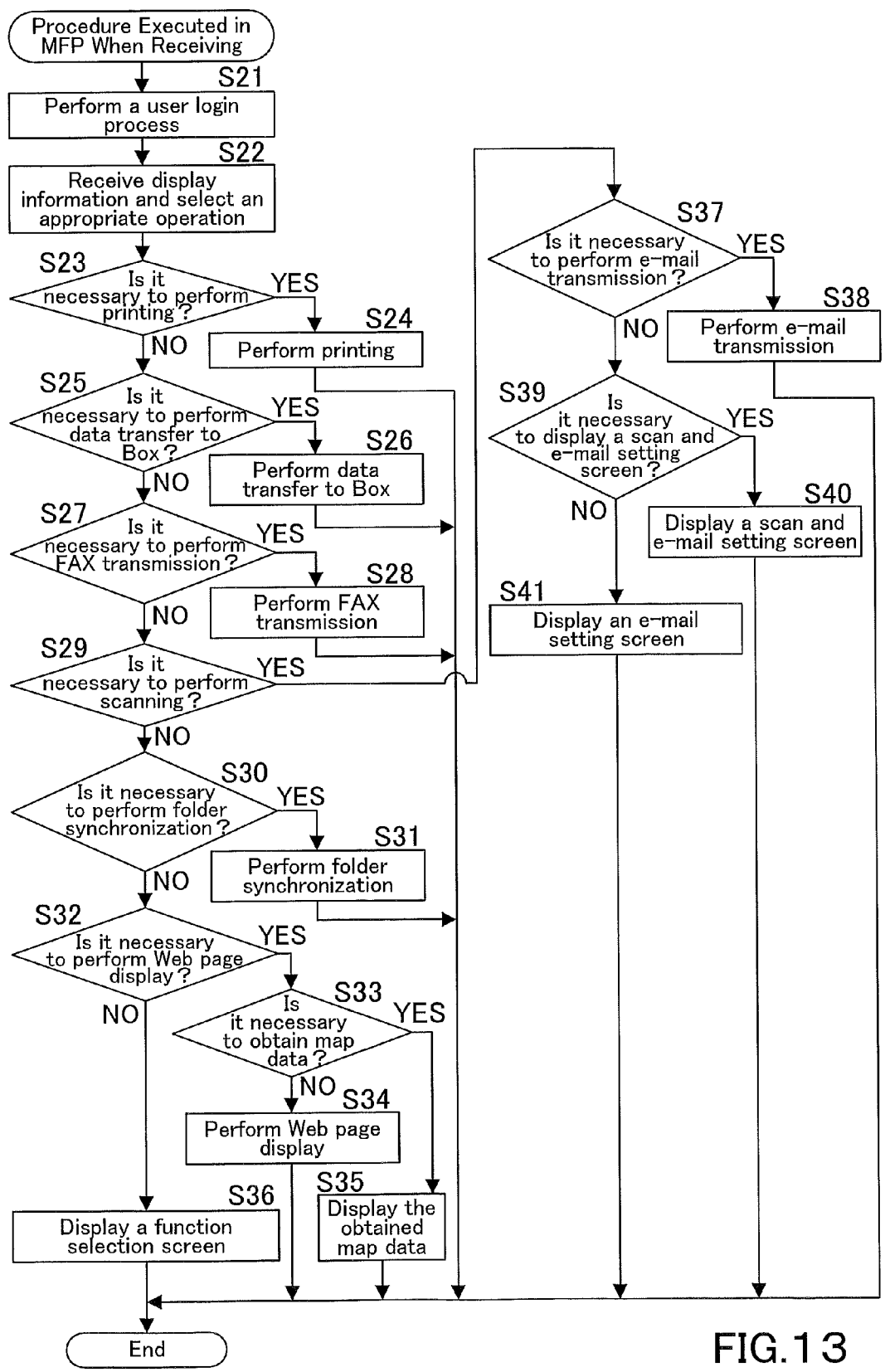
FIG. 13 is a flowchart representing a procedure executed in the image processing apparatus when receiving.

FIG. 13 is a flowchart showing a procedure executed in the MFP 2 when receiving. This procedure is executed by the CPU 21 according to an operation program recorded in a recording medium such as the ROM 22.

In Step S21, a user login process is performed based on login information received from the portable terminal 1. Then in Step S22, display information is received, and an appropriate operation to be performed by the MFP 2 is selected based on the received display information, by comparing the received display information to the table shown in FIG. 5, and also the operation logs shown in FIG. 4, if necessary.

Subsequently, it is judged in Step S23, whether or not it is necessary to perform printing by the printer 26. If it is necessary (YES in Step S23), document data included in the display information is printed out, entirely from the top page to the last page, or partially from a currently displayed page to the last page. Then the routine terminates. If it is not necessary to perform printing (NO in Step S23), then it is judged in Step S25, whether or not it is necessary to perform data transfer to Box. If it is necessary (YES in Step S25), document data included in the display information is transferred to a Box recorded in an operation log, in Step S26, then the routine terminates.

If it is not necessary to perform data transfer to Box (NO in Step S25), then it is judged in Step S27, whether or not it is necessary to perform FAX transmission. If it is necessary (YES in Step S27), document data is FAX-transmitted to an address recorded in an operation log, in Step S28, then the routine terminates. If it is not necessary to perform FAX transmission (NO in Step S27), then it is judged in Step S29, whether or not it is necessary to perform document reading (scanning) by the scanner. If it is not necessary (No in Step S29), the routine proceeds to Step S30. If it is necessary (YES in Step S29), the routine proceeds to Step S37.

In Step S30, it is judged whether or not it is necessary to perform folder synchronization. If it is necessary (YES in Step S30), folder synchronization is performed in Step S31, then the routine terminates. If it is not necessary to perform folder synchronization (NO in Step S30), then it is judged in Step S32, whether or not it is necessary to perform Web page display. If it is not necessary (NO in Step S32), the routine proceeds to Step S36. If it is necessary (YES in Step S32), then it is judged in Step S33, whether or not it is necessary to obtain map data by accessing a Web page. If it is not necessary (NO in Step S33), a Web page obtained by accessing an address included in the display information, is displayed on the display 271, in Step S34. Then the routine terminates. If it is necessary to obtain map data (YES in Step S33), map data is obtained and displayed on the display 271, in Step S35. Then the routine terminates.

In Step S36, a function selection screen is displayed on the display 271. Then the routine terminates.

Meanwhile, it is judged in Step S37, whether or not it is necessary to perform e-mail transmission. If it is necessary (YES in Step S37), e-mail transmission is performed in Step S38. More concretely, a document is read by the scanner 24 to obtain image data, and the obtained image data is transmitted to an e-mail address included in the display information or to the portable terminal 1. Then the routine terminates.

In Step S37, if it is not necessary to perform e-mail transmission (NO in Step S37), then it is judged in Step S39, whether or not it is necessary to display a scan and e-mail setting screen. If it is necessary (YES in Step S39), a scan and e-mail setting screen is displayed on the display 271 in Step S40, then the routine terminates.

In Step S39, if it is not necessary to display a scan and e-mail setting screen (NO in Step S39), an e-mail setting screen is displayed on the display 271 in Step S41, then the routine terminates.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing system in which a portable terminal and an image processing apparatus are capable of communicating with each other contactlessly, comprising:
    the portable terminal comprising:
    a display; and
    a transmitter that transmits display information indicating what is currently displayed on the display, to the image processing apparatus over contactless communication, and
    the image processing apparatus comprising:
    a receiver that receives the display information from the portable terminal over contactless communication;
    a memory that records in advance, a plurality of display information samples each indicating a user operation and specified operations for the image processing apparatus, with their connections;
    a determiner that determines the right operation based on the display information received by the receiver, from the specified operations recorded in the memory along with the display information samples with their connections; and
    a controller that makes the image processing apparatus perform the operation determined by the determiner.

2. The image processing system recited in claim 1, wherein:
    the transmitter of the portable terminal further transmits to the image processing apparatus, user information indicating the user using the portable terminal;
    the receiver of the image processing apparatus further receives the user information from the portable terminal over contactless communication;
    the memory of the image processing apparatus further records the user information and operation logs indicating the operations having been performed by the image processing apparatus according to an instruction given by the user using the portable terminal, with their connections; and
    the determiner of the image processing apparatus determines the right operation based on the display information received by the receiver and the operation logs recorded in the memory.

3. The image processing system recited in claim 2, wherein:
    the memory of the image processing apparatus further records file format types, operations, and operation start times about the documents having been processed by the image processing apparatus, separately by user as user operation logs; and
    if the display information received by the receiver indicates that a document in a particular file format is currently displayed on the display of the portable terminal, the determiner of the image processing apparatus compares the user information received by the receiver, the file format type and the receipt time of a received document, to each of the operation logs recorded in the memory, including user information, a file format type, and an operation start time, and determines the operation in the matching operation log as the right operation, and then the controller of the image processing apparatus makes the image processing apparatus perform the determined operation.

4. The image processing system recited in claim 1, wherein:

the determined operation performed by the image processing apparatus is printing a document.

5. The image processing system recited in claim 4, wherein:
if the display information received by the receiver indicates that the top page of the document is currently displayed on the display of the portable terminal, the determiner of the image processing apparatus determines printing the document entirely from the top page to the last page, as the right operation, from the specified operations recorded in the memory along with the display information samples with their connections, then the controller of the image processing apparatus makes the image processing apparatus print the document entirely from the top page to the last page; if the display information received by the receiver indicates that a page between the top page and the last page is currently displayed on the display of the portable terminal, the determiner of the image processing apparatus determines printing the document partially from the currently displayed page to the last page, as the right operation, then the controller of the image processing apparatus makes the image processing apparatus print the document partially from the currently displayed page to the last page.

6. The image processing system recited in claim 1, wherein:
the image processing apparatus further comprises a reader that reads a document; and
if the display information received by the receiver indicates that an e-mail setting screen in which a destination e-mail address is already specified, the determiner of the image processing apparatus determines displaying on a display of the image processing apparatus a setting screen to transmit to the destination e-mail address an e-mail carrying an attachment file that is image data read out from a document by the reader, as the right operation, from the specified operations recorded in the memory along with the display information samples with their connections, then the controller of the image processing apparatus makes the image processing apparatus display on its own display, a setting screen to transmit to the destination e-mail address an e-mail carrying an attachment file that is image data read out from a document by the reader.

7. The image processing system recited in claim 6, wherein:
if the display information received by the receiver includes a reading resolution of the reader of the image processing apparatus and a file format type specified for attachment files, the determiner of the image processing apparatus determines reading a document by the reader and transmitting an e-mail carrying image data obtained from the document, as the right operation, instead of displaying the setting screen on the display of the image processing apparatus, from the specified operations recorded in the memory along with the display information samples with their connections, then the controller of the image processing apparatus makes the image processing apparatus read a document by the reader and transmit an e-mail carrying image data obtained from the document, instead of making the image processing apparatus display the setting screen on its own display.

8. The image processing system recited in claim 6, wherein:
if the display information received by the receiver further indicates that predetermined information is already entered in an e-mail message field of the e-mail setting screen, the determiner of the image processing apparatus determines reading a document by the reader and transmitting an e-mail carrying image data obtained from the document, as the right operation, instead of displaying the setting screen on the display of the image processing, an apparatus from the specified operations recorded in the memory along with the display information samples with their connections, then the controller of the image processing apparatus and transmit an e-mail carrying image data obtained from the document, instead of making the image processing apparatus display the setting screen on its own display.

9. The image processing system recited in claim 6, wherein:
if the display information received by the receiver further indicates that not predetermined information is already entered in an e-mail message field of the e-mail setting screen, the determiner of the image processing apparatus determines transmitting to the portable terminal image data read out from a document by the reader, as the right operation, from the specified operations recorded in the memory along with the display information samples with their connections, then the controller of the image processing apparatus makes the image processing apparatus transmitting to the portable terminal, image data read out from a document by the reader.

10. The image processing system recited in claim 1, wherein:
if the display information received by the receiver indicates that a bookmark indicating the address of a predetermined Web page address is currently displayed on the display of the portable terminal, the determiner of the image processing apparatus determines obtaining a predetermined Web page from the address indicated by the bookmark and displaying the obtained Web page on a display of the image processing apparatus, as the right operation, from the specified operations recorded in the memory along with the display information samples with their connections, then the controller of the image processing apparatus makes the image processing apparatus obtain a predetermined Web page from the address indicated by the bookmark and displaying the obtained Web page on its own display.

11. The image processing system recited in claim 1, wherein:
the memory of the image processing apparatus holds one or more than one box that is a memory area; and
if the display information received by the receiver indicates that a folder of the portable terminal is currently displayed on the display of the portable terminal and includes a list of the files stored on the folder, the determiner of the image processing apparatus determines synchronizing between the folder of the portable terminal and its corresponding box of the image processing apparatus, as the right operation, from the specified operations recorded in the memory along with the display information samples with their connections, then the controller of the image processing apparatus makes the image processing apparatus synchronize between the folder of the portable terminal and its corresponding box of the image processing apparatus.

12. The image processing system recited in claim 1, wherein:
if the display information received by the receiver indicates that map data is currently displayed on the display of the portable terminal, the determiner of the image processing apparatus determines downloading detailed map data of the same point from a website and displaying the downloaded detailed map data on a display of the image processing apparatus, as the right operation, from the specified operations recorded in the memory along with the display information samples with their connections, then the controller of the image processing apparatus makes the image processing apparatus download detailed map data of the same point from a website and display the downloaded detailed map data on its own display.

13. An image processing apparatus capable of communicating with a portable terminal contactlessly, comprising:
a receiver that receives from the portable terminal, display information indicating what is currently displayed on a display of the portable terminal, over contactless communication;
a memory that records in advance, a plurality of display information samples each indicating a user operation and specified operations for the image processing apparatus, with their connections; and
a determiner that determines the right operation based on the display information received by the receiver, from the specified operations recorded in the memory; and
a controller that makes the image processing apparatus perform the operation determined by the determiner.

14. The image processing apparatus recited in claim 13, wherein:
the receiver further receives the user information from the portable terminal over contactless communication;
the memory further records the user information and operation logs indicating the operations having been performed by the image processing apparatus according to an instruction given by the user using the portable terminal, with their connections; and
the determiner determines the right operation based on the display information received by the receiver and the operation logs recorded in the memory.

15. The image processing apparatus recited in claim 14, wherein:
the memory further records file format types, operations, and operation start times about the documents having been processed by the image processing apparatus, separately by user as user operation logs; and
if the display information received by the receiver indicates that a document in a particular file format is currently displayed on the display of the portable terminal, the determiner compares the user information received by the receiver, the file format type and the receipt time of a received document, to each of the operation logs recorded in the memory, including user information, a file format type, and an operation start time, and determines the operation in the matching operation log as the right operation, and then the controller makes the image processing apparatus perform the determined operation.

16. The image processing apparatus recited in claim 13, wherein:
the determined operation is printing a document, and the controller makes the image processing apparatus print a document.

17. The image processing apparatus recited in claim 16, wherein:
if the display information received by the receiver indicates that the top page of the document is currently displayed on the display of the portable terminal, the determiner determines printing the document entirely from the top page to the last page, as the right operation, from the specified operations recorded in the memory along with the display information samples with their connections then the controller makes the image processing apparatus print the document entirely from the top page to the last page; if the display information received by the receiver indicates that a page between the top page and the last page is currently displayed on the display of the portable terminal, the determiner determines printing the document partially from the currently displayed page to the last page, as the right operation, then the controller makes the image processing apparatus print the document partially from the currently displayed page to the last page.

18. The image processing apparatus recited in claim 13, further comprising a reader that reads a document, wherein:
if the display information received by the receiver indicates that an e-mail setting screen in which a destination e-mail address is already specified, the determiner determines displaying on a display of the image processing apparatus a setting screen to transmit to the destination e-mail address an e-mail carrying an attachment file that is image data read out from a document by the reader, as the right operation, from the specified operations recorded in the memory along with the display information samples with their connections, then the controller makes the image processing apparatus display on the display thereof, a setting screen to transmit to the destination e-mail address an e-mail carrying an attachment file that is image data read out from a document by the reader.

19. The image processing apparatus recited in claim 18, wherein:
if the display information received by the receiver includes a reading resolution of the reader and a file format type specified for attachment files, the determiner determines reading a document by the reader and transmitting an e-mail carrying image data obtained from the document, as the right operation, instead of displaying the setting screen on the display of the image processing apparatus, from the specified operations recorded in the memory along with the display information samples with their connections, then the controller makes the image processing apparatus read a document by the reader and transmit an e-mail carrying image data obtained from the document, instead of making the image processing apparatus display the setting screen on the display thereof.

20. The image processing apparatus recited in claim 18, wherein:
if the display information received by the receiver further indicates that predetermined information is already entered in an e-mail message field of the e-mail setting screen, the determiner determines reading a document by the reader and transmitting an e-mail carrying image data obtained from the document, as the right operation, instead of displaying the setting screen on the display of the image processing apparatus, from the specified operations recorded in the memory along with the display information samples with their connections, then the controller makes the image processing apparatus read a document by the reader and transmit an e-mail carrying image data obtained from the document, instead of making the image processing apparatus display the setting screen on the display thereof.

21. The image processing apparatus recited in claim 18, wherein:
if the display information received by the receiver further indicates that not predetermined information is already entered in an e-mail message field of the e-mail setting screen, the determiner determines transmitting to the portable terminal image data read out from a document by the reader, as the right operation, from the specified operations recorded in the memory along with the display information samples with their connections, then the controller makes the image processing apparatus transmit to the portable terminal image data read out from a document by the reader.

22. The image processing apparatus recited in claim 13, wherein:
if the display information received by the receiver indicates that a bookmark indicating the address of a predetermined Web page address is currently displayed on the display of the portable terminal, the determiner determines obtaining a predetermined Web page from the address indicated by the bookmark and displaying the obtained Web page on a display of the image processing apparatus, as the right operation, from the specified operations recorded in the memory along with the display information samples with their connections, then the controller makes the image processing apparatus obtain a predetermined Web page from the address indicated by the bookmark and displaying the obtained Web page on the display thereof.

23. The image processing apparatus recited in claim 13, wherein:
the memory of the image processing apparatus holds one or more than one box that is a memory area; and
if the display information received by the receiver indicates that a folder of the portable terminal is currently displayed on the display of the portable terminal and includes a list of the files stored on the folder, the determiner determines synchronizing between the folder of the portable terminal and its corresponding box of the image processing apparatus, as the right operation, from the specified operations recorded in the memory along with the display information samples with their connections, then the controller makes the image processing apparatus synchronize between the folder of the portable terminal and its corresponding box of the image processing apparatus.

24. The image processing apparatus recited in claim 13, wherein:
if the display information received by the receiver indicates that map data is currently displayed on the display of the portable terminal, the determiner determines downloading detailed map data of the same point from a website and displaying the downloaded detailed map data on a display of the image processing apparatus, as the right operation, from the specified operations recorded in the memory along with the display information samples with their connections, then the controller makes the image processing apparatus download detailed map data of the same point from a website and display the downloaded detailed map data on the display thereof.

25. An operation method of an image processing system in which a portable terminal and an image processing apparatus are capable of communicating with each other contactlessly, comprising:
the portable terminal's:
transmitting display information indicating what is currently displayed on the display, to the image processing apparatus over contactless communication, and
the image processing apparatus's:
receiving the display information from the portable terminal over contactless communication;
determining the right operation based on the received display information, from specified operations for the image processing apparatus which are recorded in advance in a memory along with a plurality of display information samples each indicating a user operation, with their connections; and
making the image processing apparatus perform the determined operation.

26. The operation method of an image processing system, recited in claim 25, wherein:
user information indicating the user using the portable terminal is further transmitted to the image processing apparatus;
the user information is further received from the portable terminal over contactless communication;
the user information and operation logs indicating the operations having been performed by the image processing apparatus according to an instruction given by the user using the portable terminal are further recorded in the memory with their connections; and
the right operation is determined based on the received display information and the operation logs recorded in the memory.

27. The operation method of an image processing system, recited in claim 26, wherein:
file format types, operations, and operation start times about the documents having been processed by the image processing apparatus are further recorded in the memory separately by user as user operation logs; and
if the received display information indicates that a document in a particular file format is currently displayed on the display of the portable terminal, the received user information, the file format type and the receipt time of a received document are compared to each of the operation logs recorded in the memory, including user information, a file format type, and an operation start time, and the operation in the matching operation log is determined as the right operation, and then the image processing apparatus is controlled to perform the determined operation.

28. A non-transitory computer-readable recording medium having an image processing program stored thereon to make a computer of an image processing apparatus capable of communicating with a portable terminal contactlessly, execute:
receiving from the portable terminal, display information indicating what is currently displayed on a display of the portable terminal, over contactless communication;
determining the right operation based on the received display information, from specified operations for the image forming apparatus which are recorded in a memory along with a plurality of display information samples each indicating a user operation, with their connections; and
making the image processing apparatus perform the determined operation.

29. The non-transitory computer-readable recoding medium having the image processing program, recited in claim 28, wherein:
the user information is further received from the portable terminal over contactless communication;
the user information and operation logs indicating the operations having been performed by the image processing apparatus according to an instruction given by the user using the portable terminal are further recorded in the memory with their connections; and the right operation is determined based on the received display information and the operation logs recorded in the memory.

30. The non-transitory computer-readable recording medium having the image processing program, recited in claim 29, wherein:
file format types, operations, and operation start times about the documents having been processed by the image processing apparatus are further recorded in the memory separately by user as user operation logs; and
if the received display information indicates that a document in a particular file format is currently displayed on the display of the portable terminal, the received user information, the file format type and the receipt time of a received document are compared to each of the operation logs recorded in the memory, including user information, a file format type, and an operation start time, and the operation in the matching operation log is determined as the right operation, and then the image processing apparatus is controlled to perform the determined operation.

31. The non-transitory computer-readable recording medium having the image processing program, recited in claim 28, wherein:
the determined operation is printing a document, and the image processing apparatus is made to print a document.

32. The non-transitory computer-readable recording medium having the image processing program, recited in claim 31, wherein:
if the received display information indicates that the top page of the document is currently displayed on the display of the portable terminal, printing the document entirely from the top page to the last page is determined as the right operation, from the specified operations recorded in the memory along with the display information samples with their connections, then the image processing apparatus is made to print the document entirely from the top page to the last page; if the received display information indicates that a page between the top page and the last page is currently displayed on the display of the portable terminal, printing the document partially from the currently displayed page to the last page is determined as the right operation, then the image processing apparatus is made to print the document partially from the currently displayed page to the last page.

33. The non-transitory computer-readable recording medium having the image processing program stored thereon to further make the computer execute reading a document, recited in claim 28, wherein:
if the received display information indicates that an e-mail setting screen in which a destination e-mail address is already specified, displaying on a display of the image processing apparatus a setting screen to transmit to the destination e-mail address an e-mail carrying an attachment file that is image data read out from a document is determined as the right operation, from the specified operations recorded in the memory along with the display information samples with their connections, then the image processing apparatus is made to display on the display thereof, a setting screen to transmit to the destination e-mail address an e-mail carrying an attachment file that is image data read out from a document.

34. The non-transitory computer readable recording medium having the image processing program, recited in claim 33, wherein:
if the received display information includes a reading resolution of the reader and a file format type specified for attachment files, reading a document and transmitting an e-mail carrying image data read out from the document is determined as the right operation, instead of displaying the setting screen on the display of the image processing apparatus, from the specified operations recorded in the memory along with the display information samples with their connections, then the image processing apparatus is made to read a document and transmit an e-mail carrying image data read out from the document, instead of making the image processing apparatus display the setting screen on the display thereof.

35. The non-transitory computer readable recording medium having the image processing program, recited in claim 33, wherein:
if the received display information further indicates that predetermined information is already entered in an e-mail message field of the e-mail setting screen, reading a document and transmitting an e-mail carrying image data read out from the document are determined as the right operation, instead of displaying the setting screen on the display of the image processing apparatus, from the specified operations recorded in the memory along with the display information samples with their connections, then the image processing apparatus is made to read a document and transmit an e-mail carrying image data read out from the document, instead of making the image processing apparatus display the setting screen on the display thereof.

36. The non-transitory computer readable recording medium having the image processing program, recited in claim 33, wherein:
if the received display information further indicates that not predetermined information is already entered in an e-mail message field of the e-mail setting screen, transmitting to the portable terminal image data read out from a document is determined as the right operation, from the specified operations recorded in the memory along with the display information samples with their connections, then the image processing apparatus is made to transmit to the portable terminal image data read out from a document.

37. The non-transitory computer-readable recording medium having the image processing program, recited in recited in claim 28, wherein:
if the received display information indicates that a bookmark indicating the address of a predetermined Web page address is currently displayed on the display of the portable terminal, obtaining a predetermined Web page from the address indicated by the bookmark and displaying the obtained Web page on a display of the image processing apparatus are determined as the right operation, from the specified operations recorded in the memory along with the display information samples with their connections, then the image processing apparatus is made to obtain a predetermined Web page from the address indicated by the bookmark and displaying the obtained Web page on the display thereof.

38. The non-transitory computer-readable recording medium having the image processing program, recited in claim 28, wherein:
the memory holds one or more than one box that is a memory area; and
if the received display information indicates that a folder of the portable terminal is currently displayed on the display of the portable terminal and includes a list of the files stored on the folder, synchronizing between the folder of the portable terminal and its corresponding box of the image processing apparatus is determined as the right operation, from the specified operations recorded in the memory along with the display information samples with their connections, then the image processing apparatus is made to synchronize between the folder of the portable terminal and its corresponding box of the image processing apparatus.

39. The non-transitory computer-readable recording medium having the image processing program, recited in claim 28, wherein:

if the received display information indicates that map data is currently displayed on the display of the portable terminal, downloading detailed map data of the same point from a website and displaying the downloaded detailed map data on a display of the image processing apparatus are determined as the right operation, from the specified operations recorded in the memory along with the display information samples with their connections, then the image processing apparatus is made to download detailed map data of the same point from a website and display the downloaded detailed map data on the display thereof.

* * * * *